US 7,860,069 B2

(12) United States Patent
Wawra et al.

(10) Patent No.: US 7,860,069 B2
(45) Date of Patent: Dec. 28, 2010

(54) COMMUNICATIONS SYSTEM

(75) Inventors: Michael Wawra, London (GB);
Deborah Baruch, Malakoff (FR)

(73) Assignee: France Telecom, Paris (FR)

( * ) Notice: Subject to any disclaimer, the term of this patent is extended or adjusted under 35 U.S.C. 154(b) by 497 days.

(21) Appl. No.: 11/090,261

(22) Filed: Mar. 28, 2005

(65) Prior Publication Data

US 2005/0220061 A1 Oct. 6, 2005

(30) Foreign Application Priority Data

Apr. 2, 2004 (EP) .................................. 04290890

(51) Int. Cl.
*H04Q 7/24* (2006.01)
(52) U.S. Cl. ...................... 370/338; 370/469; 370/328; 455/432.1; 455/552.1
(58) Field of Classification Search ................. 370/338, 370/352; 455/552.1, 556.1
See application file for complete search history.

(56) References Cited

U.S. PATENT DOCUMENTS

| | | | | |
|---|---|---|---|---|
| 6,665,537 B1 * | 12/2003 | Lioy | ........................ | 455/435.1 |
| 6,999,436 B2 * | 2/2006 | Zheng et al. | ................. | 370/331 |
| 7,184,527 B1 * | 2/2007 | Lin et al. | .................. | 379/93.17 |
| 7,209,978 B2 * | 4/2007 | Thubert et al. | ............... | 709/242 |
| 2003/0236827 A1 | 12/2003 | Patel et al. | | |
| 2004/0266420 A1 * | 12/2004 | Malinen et al. | .............. | 455/421 |
| 2005/0195780 A1 * | 9/2005 | Haverinen et al. | ........... | 370/338 |
| 2009/0046635 A1 * | 2/2009 | Watanuki et al. | ............. | 370/328 |

OTHER PUBLICATIONS

Charles E. Perkins, "Mobile IP", IEEE Communications Magazine, vol. 35, No. 5. May 1, 1997, pp. 84-86 and 91-99.
Charles E. Perkins et al., "Mobility Support in IPV6", Proceedings of the Second Annual International Conference on Mobile Computing and Networking (MobiCom '96), Nov. 10-12, 1996, pp. 1-11.
D. Wisely et al., "IP for 3G, Networking Technologies for Mobile Communications", 2002, pp. 143-200.

* cited by examiner

*Primary Examiner*—Temica M Beamer
(74) *Attorney, Agent, or Firm*—Oblon, Spivak, McClelland, Maier & Neustadt, L.L.P.

(57) ABSTRACT

A communications system is provided, the system being operable to provide a communications session utilizing an internet protocol, such as for example IPv4, IPv6 and their extensions mobile IPv6 or IPv4. The system includes a mobile node having an application program and an operating system. The application program is operable to provide the communications session using an internet protocol address information. The operating system is operable to monitor the internet protocol address information and to inform the application program of a change of internet protocol address information. The application program is arranged to adapt the communications session in accordance with the change of internet protocol address information. As a result of the operating system informing the application program of a change of the internet protocol address information, the application program can adapt the operation of the communications session to reduce a likelihood of the communications session being affected when the IP address changes.

18 Claims, 6 Drawing Sheets

COMMUNICATIONS SYSTEM

CROSS-REFERENCE TO RELATED APPLICATIONS

The present application claims priority under 35 U.S.C. §119(a)-(d) to European application no. 04290890.5 filed on Apr. 2, 2004, the contents of which are herein incorporated by reference.

FIELD OF THE INVENTION

The present invention relates to communications systems and methods for providing communications sessions utilising an internet protocol. The present invention also relates to mobile nodes, notification modules and notification plug-ins.

BACKGROUND OF THE INVENTION

Communications networks, which utilise an Internet Protocol (IP), provide a facility for communications nodes, such as personal computers, mobile devices and servers to communicate information during communications sessions. According to the Internet Protocol used, each communications node is provided with an IP address, which uniquely identifies that node within the IP network. These IP addresses may be either permanently assigned to a communications node, or assigned at a time at which a node affiliates itself with the network. More recently, access to IP networks has been possible using mobile nodes such as mobile phones and portable computers. For example, a mobile node may access an IP network via some form of wireless connection, for instance by a radio communications network or an infra-red link. As such an IP address may be assigned to a communications node on a temporary basis, which may change during a communications session. Accordingly, the communications session may be affected by a change of the IP address of the mobile node, resulting from, for example, a change of affiliation from one network to another during a communications session.

SUMMARY OF INVENTION

Viewed from a first aspect, the present invention provides a communications system operable to provide a communications session utilising an internet protocol. The system comprises a mobile node having an application program and an operating system. The application program is operable to provide the communications session using internet protocol address information. The operating system is operable to monitor the internet protocol address information and to inform the application program of a change of the internet protocol address information. The application program is arranged to adapt the communications session in accordance with the change of the internet protocol address information.

In one example, the system includes a mobile node and a correspondent node, the mobile node being arranged to provide a communications session with the correspondent node using an application program operating on the mobile node.

Embodiments of the present invention are arranged to inform an application program operating on a mobile node that an Internet Protocol (IP) address for use in communicating IP packets has changed during a communications session. An operating system is arranged to provide an indication that IP address information for the mobile node has changed. The change of the address information may include adding a new IP address to an IP stack of the operating system, following, for example, a change or initiation of a change of affiliation of the mobile node from a first network to a second network, the initiation being the beginning of a process for changing the affiliation. Correspondingly, the change of the address information may be deleting an IP address from the IP stack of the operating system, after the change of affiliation has been completed.

After being notified that the IP address information has changed the application program is able to take action to adapt the operation of the communications session. As such the application program can reduce a likelihood of the communications session being affected during a period in which the mobile node changes IP address, for example as a result of a change of affiliation from one network to another.

The application program may be arranged to adapt the communications session following the notification of the change of the IP address information. For example, the change of IP address information, which is typically associated with a change affiliation of the mobile node from one network to another, may have an effect of disrupting the communication of IP packets for a period during which the change of affiliation is being effected. Therefore some embodiments may include suspending communication of IP packets or at least adapting the rate of communicating the IP packets. The suspension or the change of the rate may be effected for example, until an IP address of an IP network with which the node was affiliated has been deleted from the IP stack. In other embodiments, the application program may be arranged to provide an indication to a corresponding application program operating on a correspondent node, that a new IP address should be used for communicating IP packets to the mobile node. For example, the application program on the mobile node may be adapted to monitor the new IP address, as well as an old IP address for receipt of IP packets from the correspondent node. During a period in which the mobile node monitors both the new IP address and the old IP address, the two IP addresses are available contemporaneously for use by the mobile node. The old IP address may be an address used for communicating IP packets on an IP network with which the mobile node was affiliated before a process of changing affiliation to the new IP network began. In some embodiments the correspondent node may be informed of the new IP address by the application program on the mobile node using a Session Initiation Protocol (SIP) message.

In some embodiments the operating system includes an IP stack having an IP address table for storing IP addresses, an address adder for adding IP addresses and an address remover for removing IP addresses from the IP address table. The operating system may include a notification plug-in and a notification module. The notification plug-in may be operable to monitor the IP stack and to provide a notification of a change of IP addresses in the IP stack in accordance with an addition or deletion of addresses from the IP address table. The notification is provided to the notification module. The notification module is operable to inform the application program of the change of IP address information based on the notification received from the notification plug-in.

Embodiments of the present invention can be used when delivering mobile services to telecommunication subscribers as they roam between different access networks such as WLAN (Wireless Local Area Network), GSM (Global System for Mobile Communications) and UMTS (Universal Mobile Telecommunications System). Additionally, these techniques are particularly applicable to use with the Session Initiation Protocol (SIP) to enable an application to initiate a SIP hand-over. Embodiments of the present invention are not limited to application to a particular internet protocol and can be used with mobile IPv6 and IPv4 for example.

Various further aspects and features of the present invention are defined in the appended claims and include a communications method, a mobile node, a notification module and a notification plug-in.

BRIEF DESCRIPTION OF THE DRAWINGS

Embodiments of the present invention will now be described by way of example only with reference to the accompanying drawings, where like parts are provided with corresponding reference numerals, and in which.

DESCRIPTION OF EXAMPLE EMBODIMENTS

According to a current IETF (Internet Engineering Task Force) Internet standard for managing mobility, known as the Mobile Internet Protocol version 6 (MIPv6), a 'care-of' address is allocated to a mobile node when it changes affiliation from one network to another. With this technique, a mobile node is identified by a permanent address ('home address') used by all application programs which does not change and a mapping between the 'care of address' and the 'home address' is handled at the IP level of the mobile device. When the mobile node moves into a different network, it acquires from the new network a 'care-of' address that is then provided to the IP stack of the various devices in communication with the mobile node. Packets which are addressed to the nodes home address are then automatically routed across the network to the care-of address. With MIPv6 the application program running on the mobile node is unaware of the change of IP address.

One approach to managing IP address changes at the application level within a mobile-enabled network is to use a polling method. This is an application program based method in which an application program operating on the mobile node regularly compares the current IP address, obtained by polling the Operating System, to one stored in the application program itself, and can thereby 'discover' changes.

Figure 1:
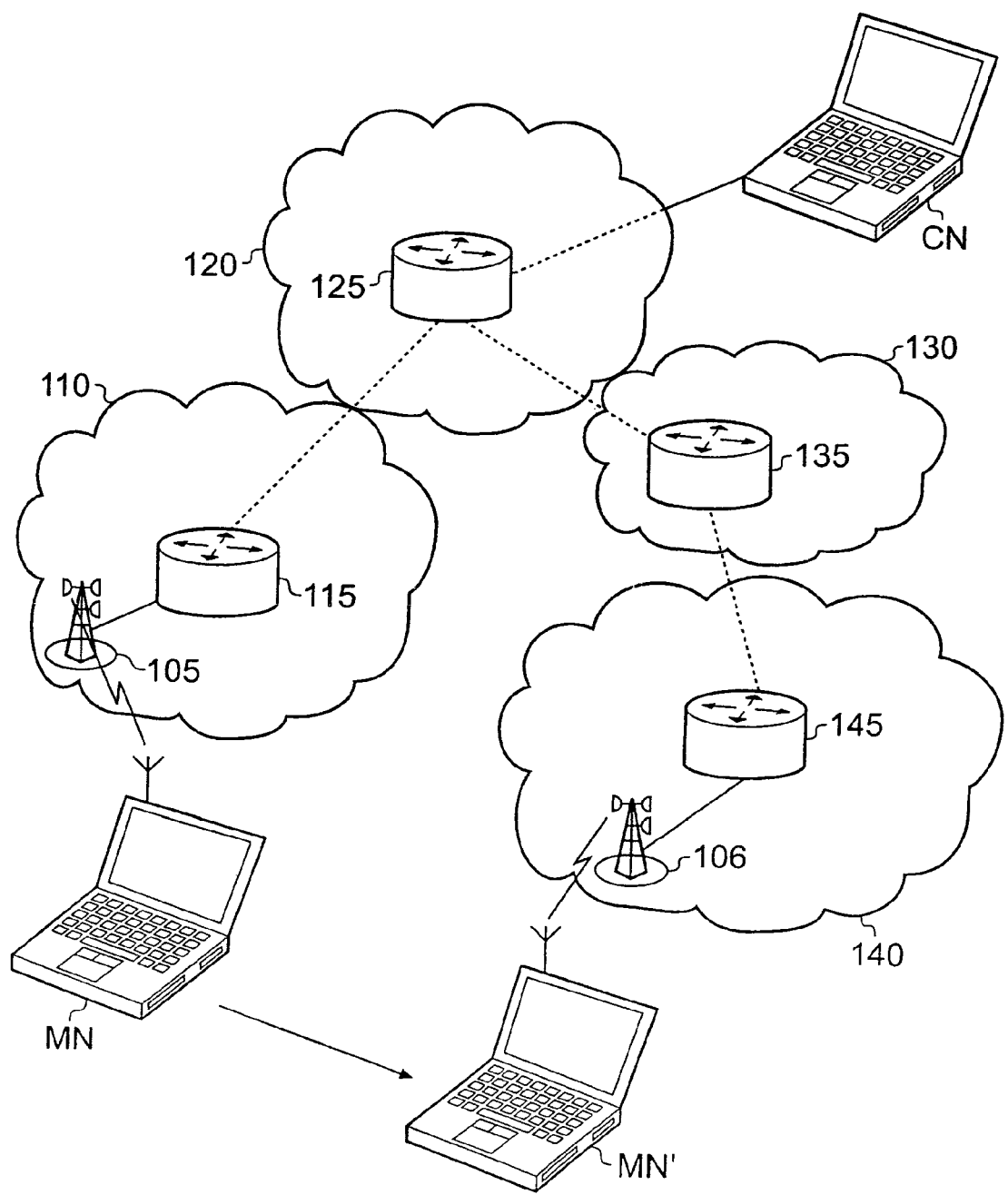
FIG. 1 is a schematic block diagram providing a simplified representation of a general Internet Protocol (IP) communication between a mobile user equipment and a correspondent node.

FIG. 1 schematically represents a general Internet Protocol (IP) communication arrangement between a mobile user equipment MN and a correspondent node CN illustrating a process during which the IP address of the mobile node changes. In FIG. 1 there are shown a number of separate networks 110, 120, 130 and 140 capable of communicating with each other, and with user nodes CN, MN accessible to them. Communication paths between networks and between users within or across networks is controlled by means of one or more routers 115, 125, 135 and 145 present within the networks 110, 120, 130, 140. User nodes may be connected to a network by any suitable method. For instance a user node (mobile or correspondent) may be connected to a network 120 via a telephone line or cable connection. In the case of a mobile user node such as mobile node MN, connection may be via a radio mobile network using a transmitter/receiver 105, 106.

An example communication link between two user nodes is illustrated in FIG. 1 for an IP communications session between the mobile node MN and the correspondent node CN. Communications between these two user nodes span two networks 110 and 120, the communication between the mobile node MN and the correspondent node CN being controlled by respective routers 115 and 125. Communication between the mobile node MN and the correspondent node CN utilises specified IP addresses for each of the nodes. For the present example, the correspondent node CN is assumed to retain a fixed IP address throughout the duration of the communications session with the mobile node MN, although in other examples the correspondent node may too be mobile. For the case of the mobile node MN, if the node were to move outside the operational area of the network 110, communication via the existing communication path will be terminated and an IP address allocated by the router 115 will be lost.

In FIG. 1, a change of affiliation to a new network is illustrated by the mobile node MN', which indicates schematically the position of the mobile node MN after moving out of the operational area of the network 110 and into the operational area of the network 140. It can be seen that a new communications path now exists between the mobile node MN' and the correspondent node CN, now using the networks 120, 130 and 140 under control of the routers 125, 135 and 145. The transition from the first communication path between the mobile node MN and the correspondent node CN to the second communication path between the mobile node MN' and the correspondent node CN may disrupt the communications session between the two nodes.

Figure 2:
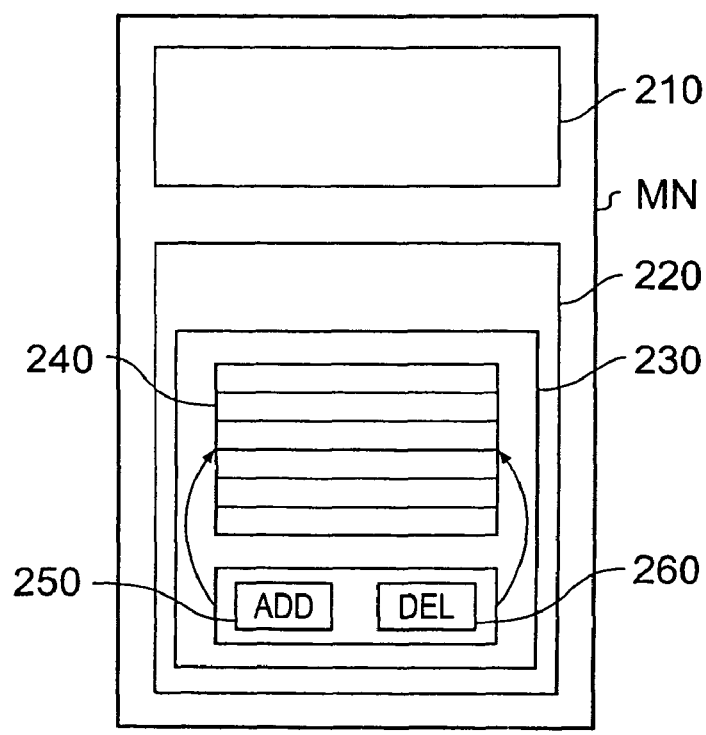
FIG. 2 is a schematic block diagram of a simplified representation of a mobile node having an operating system and an application.

FIG. 2 schematically illustrates a simplified representation of a mobile node MN suitable for use with the communications session, such as that described above with reference to FIG. 1. As shown in FIG. 2, the mobile node has an operating system 220 and an application program 210. The application program 210 may serve to control a user interface and to present information to a user, and may include communications functions to manage data to be communicated to an application program at a correspondent node CN, and to process data received from the correspondent node CN.

The operating system 220 includes an IP stack 230 which controls communications between the mobile node MN and external networks and devices. The IP stack 230 includes and IP stack address table 240 which stores one or more IP addresses attributed to the mobile node MN by respective networks with which the mobile node MN is able to communicate. Further IP addresses can be added to the IP stack address table 240 using an address adder module 250 within the IP stack 230 of the operating system 220. IP addresses can be deleted from the IP stack address table 240 using an address remover module 260 within the IP stack 230 of the operating system 220. In the mobile node MN of FIG. 2 the application program 210 is substantially unaware of the activity of the IP stack 230, and the mobile node MN in particular is unaware of the state of the IP stack address table 240.

The node of FIG. 2 may typically operate under the MIPv6 protocol. An aspect of MIPv6 is that a change of IP address is hidden from any application programs running on the mobile node. Indeed, with MIPv6, the application program is aware of a permanent 'Home' address of the mobile node, and the changes of the 'care of' address are handled at the IP level. However, as discussed above, managing a change of IP address at the application program level is in some cases highly desirable. Indeed, the change of IP address can affect application programs involved in media communications, causing loss of packets and disruption. To reduce these session disruptions and reduce packet loss, appropriate mechanisms can be implemented at the application program level. For instance, a reduction in disruption may be achievable by notifying correspondent nodes of the change of IP address experienced by the mobile node. Another mechanism for reducing disruption is for the application program to maintain, when possible, the session corresponding to the initial IP address opened on a first network, until the change of IP address is acknowledged by the correspondent nodes, while opening a session with the new IP address under a second network. In order for such session mobility management functions to be integrated into multimedia application programs, the change of IP address occurring at the IP level should be notified to the application program. If the change of IP address is hidden to the application program, no recovery mechanism or enhanced features for handling this change of IP address can be implemented.

Existing techniques by which application programs may detect a change of IP address require the application programs to constantly check (or "poll") the IP address within the IP stack address table 240 for changes. Regularly polling an operating system to detect a change of IP address can have a negative impact on system performance, which can degrade multimedia session quality. Also, it can result in overloading the operating system and can introduce delays in the detection of the change depending on the frequency of the polling.

Figure 3:
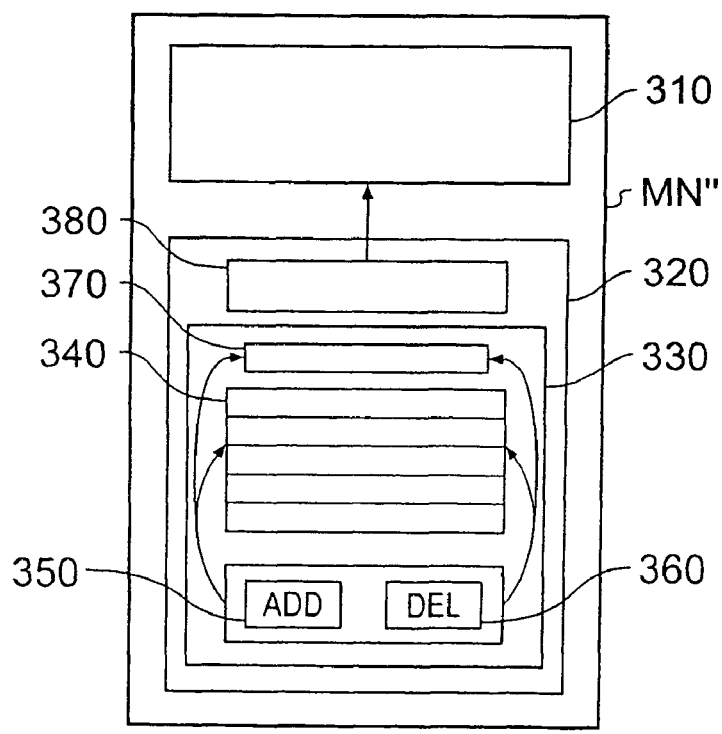
FIG. 3 is a schematic block diagram of a simplified representation of the mobile node of FIG. 2 including an adapted operating system.

FIG. 3 schematically illustrates a simplified representation of a mobile node MN" similar to that described above with reference to FIG. 2. Mobile node MN" includes an application program 310 and an operating system 320. The operating system 320 includes an IP stack 330 having an IP stack address table 340 and an address adder module 350 and an address remover module 360. However, in contrast to the mobile node MN shown in FIG. 2, the IP stack 330 also includes a notification plug-in 370 arranged to monitor the IP stack address table 340. The monitoring in this example is affected by providing the notification plug-in 370 with an update from the address adder module 350 and the address remover modules 360 when they are activated to make a change to the IP stack address table 340. The operating system 320 of the mobile node MN" includes a notification module 380 which is operable to communicate with the application program 310 to pass on information about additions to or deletions from the IP stack address table 340. The notification module is informed of these changes by the notification plug-in 370.

The notification plug-in 370 provides an advantage to the mobile node MN" because the IP address is made available to the application program 310 without a need for heavy polling to be performed by the operating system 320. As such, performance is improved while complexity is reduced. Events are only triggered when an address is added or removed, with the result that a smaller number of operations are performed compared to a mechanism in which regular updates are made regardless of whether a change has occurred. Communications nodes having the plug-in 370 are provided with an advantage when applied to streaming media communications, particularly for systems operating in a node-controlled mobility environment. Such nodes may be provided with an improved facility in that the notification plug-in 370 can allow an application program to adapt the media in accordance with an indicated change in the IP address. In addition, it addresses the need of multimedia application programs, such as SIP enabled application programs, to be informed of changes of IP address of the mobile node as it roams between access networks.

It should be understood that the actual structure chosen for providing the application layer with IP notification information is not limited to the particular Operating System implementation described herein. Although the example operating system uses a notification plug-in 370 and a notification module 380, different operating system arrangements suitable for providing the appropriate IP address monitoring and notification functionality are also contemplated, and may be advantageous for particular existing or future operating systems and mobile environments.

Figure 4:
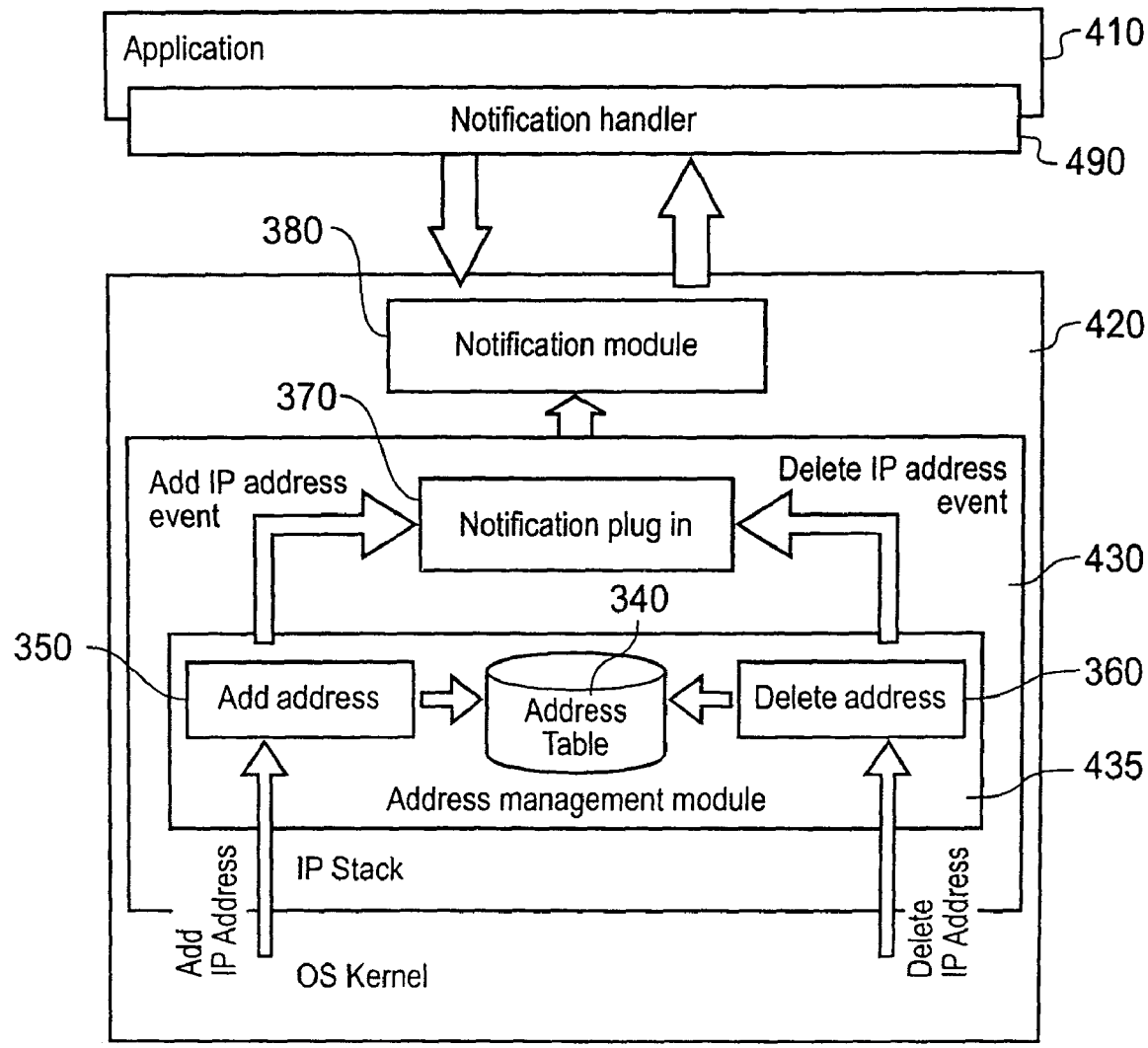
FIG. 4 is a schematic block diagram of an example architecture for implementation of the adapted operating system illustrated in FIG. 3.

FIG. 4 schematically illustrates in more detail the example mobile node architecture described in relation to FIG. 3. This architecture includes an application layer 410 and an Operating System (OS) kernel 420. The notification mechanism used in this example implementation can be viewed as comprising four distinct entities. These entities are the address management module 435, the notification plug-in 370, the notification module 380 and the notification handler 490.

The OS kernel 420 includes an IP stack 430 which in turn includes the address management module 435 containing the address adder and address remover modules 350 and 360 described in relation to FIG. 3. As with FIG. 3, the address adder and address remover modules are used for adding and removing IP addresses to and from the IP stack address table 340. Generally, any OS implementation of an IP stack contains a table for managing IP addresses, and a set of associated methods to manage these addresses in the table. For instance, the IPv6 Stack version 1.23 for Linux (RTM) uses a table referred to as inet6_addr_1st and uses methods referred to as ipv6_add_addr( ) and ipv6_del_addr( ) to insert or delete an IP address in this table each time an IP address is acquired or lost. Similarly, the Microsoft (RTM) IPv6 Stack version 1.4 for Windows (RTM) uses a list of AddrObj( ) objects, the InsertAddrObj( ) method to add an IP address and the RemoveAddrObj( ) method to delete an IP address.

The OS kernel 420 includes the notification module 380. The notification module may itself maintain a table of active IP addresses. When the notification module is notified by the IP stack that an address has been deleted, it removes the corresponding address from the table and notifies the application program that this address has been deleted. The mechanism can also provide (where available) an alternative IP address for use by the application program. In this way, the notification mechanism can notify various application programs of any change to the IP address of the node.

The IP stack 430 also includes the notification plug-in 370. This is the part of the IP stack code that has to be modified to interact with the notification module 380 and allows the notification mechanism to be started and stopped. It is an extension of a standard IP stack that allows it to communicate proactively with application programs within the application layer 410.

The notification plug-in 370 defines a structure which includes function pointers to callable functions in the notification module 380. When the notification functions are loaded, the notification module 380 sets the function pointers in the structure, which can then be accessed by the IP stack using macros. The macros check whether the corresponding pointer is valid (i.e. not NULL, indicating that the notification functions have not been started, or else are unavailable) and call the corresponding notification functions.

In order for an application program to be notified of changes in the IP address, a notification handler 490 is integrated into the application layer 410. The notification handler 490 interfaces with the notification module 380 within the OS kernel, preferably using an application programming interface (API), and handles notification messages sent by the notification module 380 to application programs within the application layer 410, allowing application programs to receive and utilise information about the IP addresses available to the system.

An example implementation of a notification handler 490 is based around "event-messaging" and consists of the application program receiving events from the notification module when a change of IP address occurs through the normal event system of the operating system 420. In this case, a new pair of events should be registered/declared in the operating system 420, the events corresponding to a notification that an IP address has been added to the IP stack address table 340 of the operating system 420, and to a notification that an IP address has been deleted from the IP stack address table 340 of the operating system 420. The associated parameters for these events would be the relevant IP address that has been added or removed. The addition of these events into the operating system 420 allow an application program developer to maintain control over the mobility features of a given application program.

An alternative example implementation of a notification handler 490 is based around a custom application programming interface (API) which could be provided to an application program developer. The supplied API would handle messaging functions and use function call-back to the application program. The application program developer can then develop his application program with the API provided, embedding the notification mechanism into the application program itself. The API would provide methods to register with the notification module 380 to receive notification of change of IP addresses, to listen on a specified socket connection for notification, and to inform the application program of particular predetermined events. Example events of which the application program may be notified could include notification that the mobile node no longer has an operational IP address and is not connected to any network, that a new IP address should be used, or that the current IP address is no longer available, in which case a new IP address to be used is provided.

Figure 5:
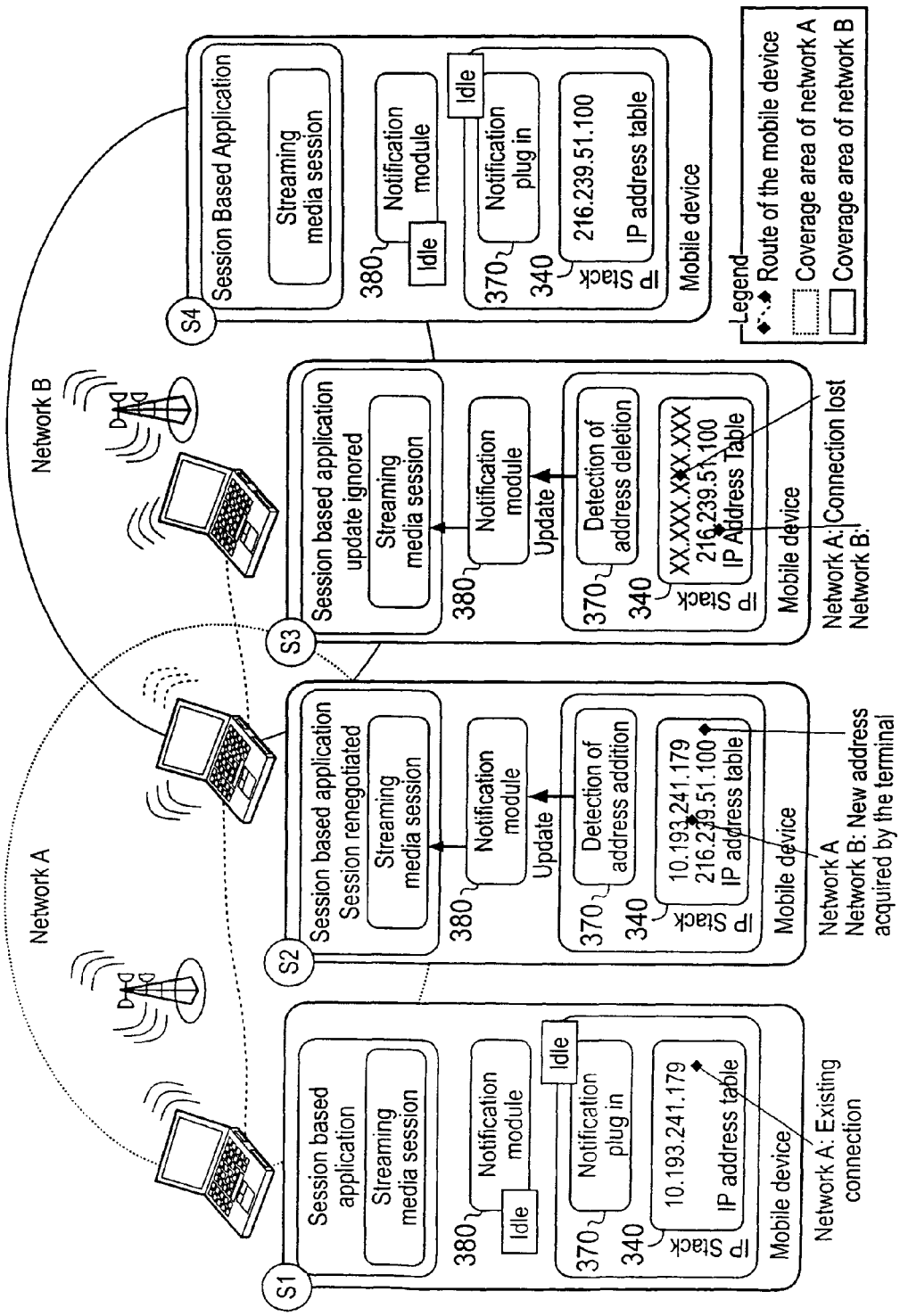
FIG. 5 is a schematic illustration of an IP update process which may occur during hand-over of a mobile node from a first network to a second network.

FIG. 5 schematically illustrates an IP update process which may occur during the hand-over of a mobile node from a first network to a second network. Embodiments of the invention seek to provide a generic solution for notifying an application program of a change of IP address on a mobile node. The IP update process described provides a facility for communicating between the IP stack and the application layer, enabling the IP stack to notify any relevant application programs of a change of IP address.

In the described arrangement, notification of the application layer by the IP stack is triggered by changes to the IP stack address table 340. Each implementation of an IP stack features a function to "manage" all of the available IP addresses. When this is changed (i.e. when an address is added to or removed from the table) the notification system generates an event. A notification module 380 installed on the system can then be started, and will be operable to interface between the IP stack and any relevant application programs such that any IP stack activity can be reported to the notification module 380 for distribution to any relevant application programs, such as multimedia application programs.

Referring to FIG. 5, a situation is represented in which two radio mobile networks, Network A and Network B, provide an overlapping coverage area. In this example, a mobile node operating a streaming media session moves from the zone of coverage of network A to that of network B. The mobile node changes affiliation as it moves from a coverage area provided by network A to a coverage area provided by network B, acquiring an IP address from the relevant network at a given time. It should be understood that although radio networks have been used in this example, the same principles apply to any IP network and access network, wireless or fixed.

The basic affiliation transfer stages can be seen as stages S1 to S4 in FIG. 5. At a stage S1, the mobile node is initially attached to a network (network A). The existing IP address previously allocated by network A to the mobile node appears in the address table of the IP stack. The notification functions (the notification module 380 and the notification plug-in 370) are loaded in the system but are idle at this stage. A media session, for instance a streaming session, is opened with a corresponding node, the corresponding node not being represented in FIG. 5.

At a stage S2, the mobile node attaches to another network (network B). As the mobile node is moving, it enters the area of coverage of network B, and although still affiliated to network A, acquires an IP address from network B. At this point the IP stack address table 340 now contains two IP addresses: the IP address initially allocated by network A and the new IP address allocated by network B. The notification plug-in 370, initially idle, is activated by the insertion of the second IP address in the table and reacts by informing the notification module 380 of the addition of the IP address. The role of the notification module 380 includes interfacing with application programs running on the mobile node. It therefore informs, in turn, the session based application program that a new IP address is available. This information is then processed by the application program, which for instance can decide (as is the case here) to renegotiate a session with a correspondent application program on another node using the new IP address of the mobile node.

At a stage S3, the mobile node exits the area of coverage of network A and therefore loses its connection with that network and consequently the IP address corresponding to network A. The IP address initially allocated by network A is removed from the IP address table 340 of the IP stack. Network B's IP address remains in the IP stack. Upon deletion by the IP Stack of one of the IP address, the notification plug-in 370 informs the notification module 380 of this deletion. In a similar way to the IP address addition, the notification module 380 informs the media application program of the deletion of the IP address. The application program is then able to launch the relevant procedures in accordance with its programming. In the example of FIG. 5, the application program ignores this information.

At a stage S4, the change of affiliation and of active IP address is completed and the notification functions returns to an idle state. The media session continues to use the IP address allocated by network B.

Figure 6:
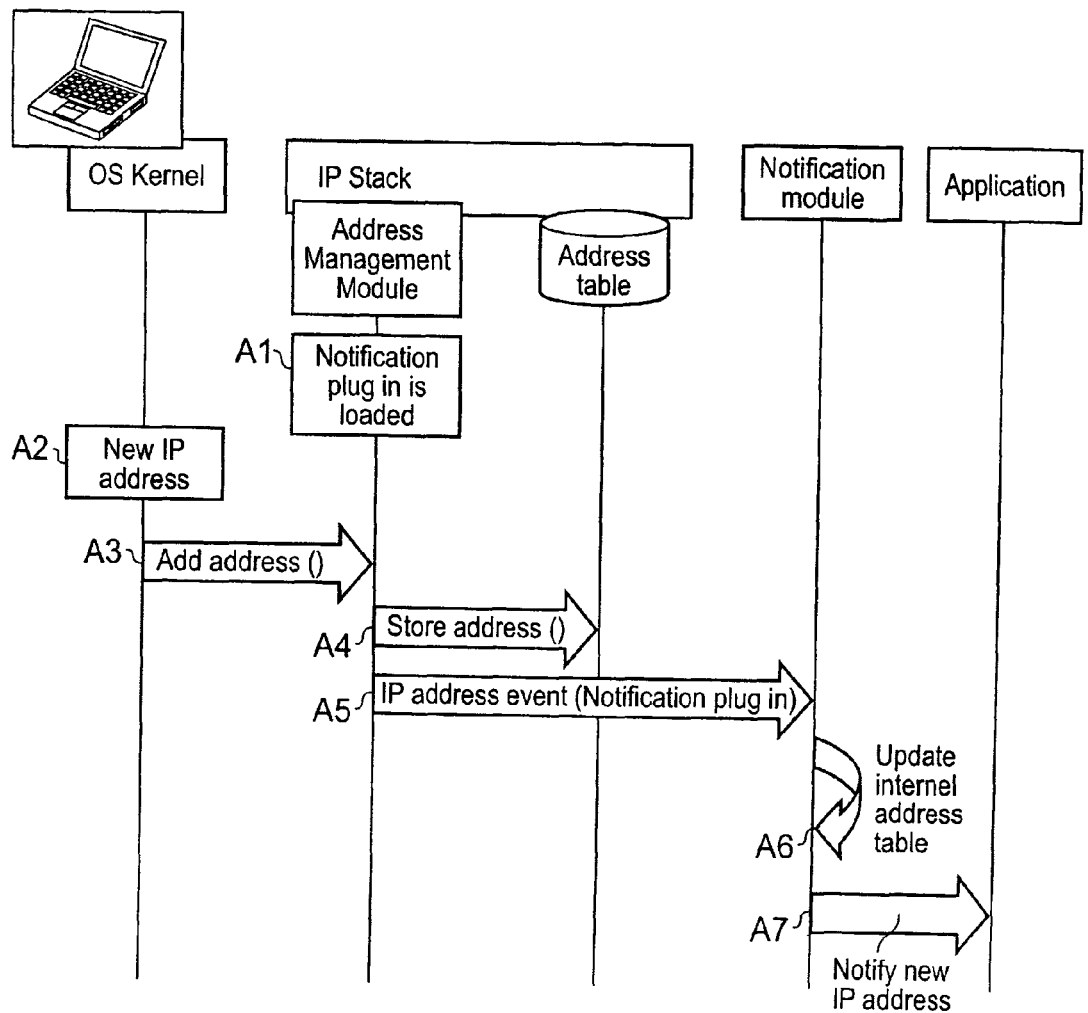
FIG. 6 is a schematic flow diagram illustrating a process for notifying an application of a new IP address available to the mobile node on which the application is operating.

FIG. 6 schematically illustrates a process in which an application program is notified of the addition of an IP address to the IP stack address table at the IP layer of the operating system. At a step A1, when the notification module is started, the notification plug-in is loaded within the address management module of the IP stack. At a step A2, the OS kernel of the mobile node acquires a new IP address from a network to which the mobile node is beginning an affiliation process. At a step A3, an address adder method of the IP stack address management module is called. At a step A4, the new IP address is added to the address table of the IP stack. At a step A5, the add address method calls the corresponding notification module method, specified by the notification plug-in, to inform the notification of the change of IP address. At a step A6, the notification module updates its internal record of available IP addresses. At a step A7, the notification module notifies any application program which has subscribed to the notification functions, that the mobile node has acquired a new IP address.

Figure 7:
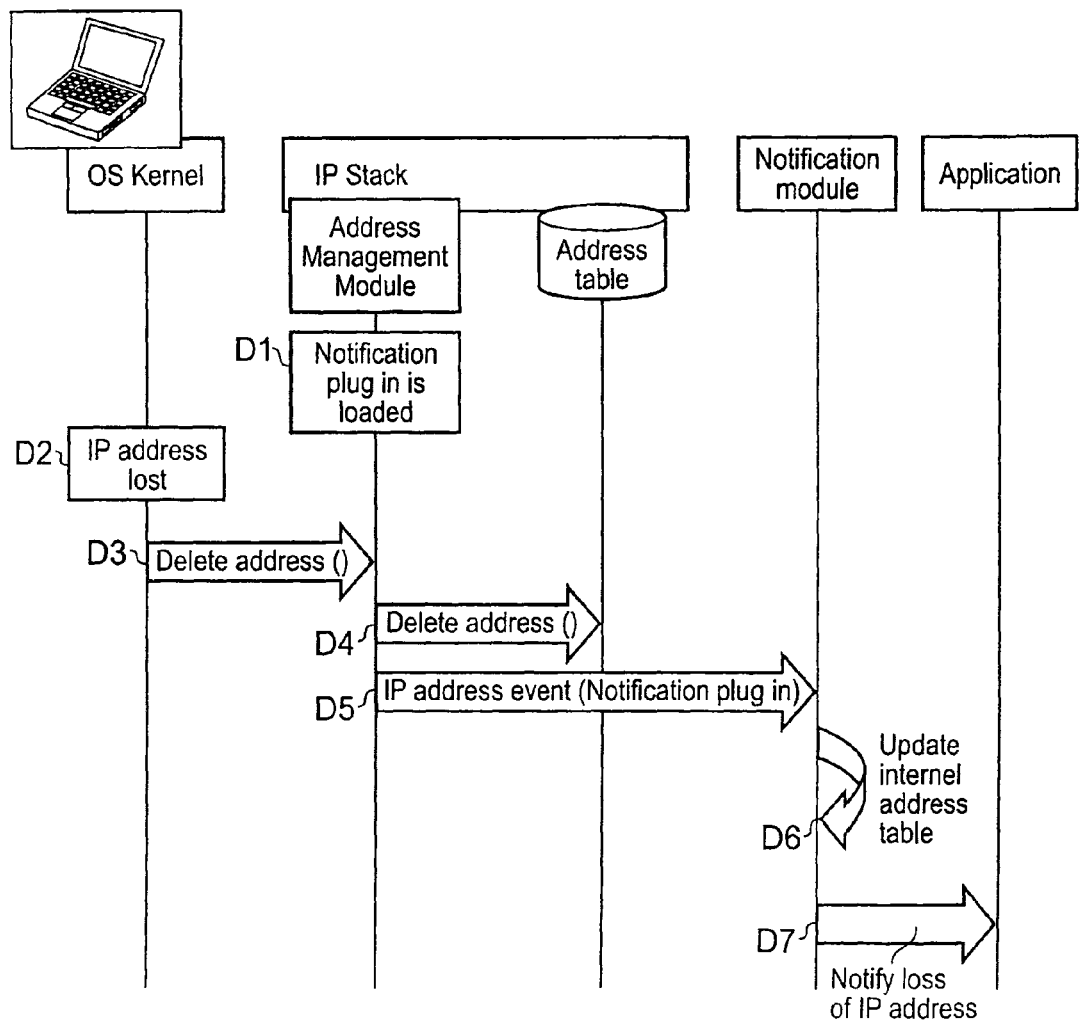
FIG. 7 is a schematic flow diagram illustrating a process for notifying an application of an IP address which is no longer available to the mobile node on which the application program is operating.

FIG. 7 schematically illustrates the steps taken in notifying an application program of the deletion of an IP address from the IP stack address table at the IP layer of the operating system. At a step D1, when the notification module is started, the notification plug-in is loaded within the address management module. At a step D2, the OS kernel of the mobile node detects the loss of an IP address. At a step D3, an address remover method of the IP stack address management module is called. At a step D4, the IP address is removed from the address table of the IP stack. At a step D5, the address remover method calls the corresponding method of the notification module, specified by the notification plug-in, to inform the notification module of the change of IP address. At a step D6, the notification module updates its internal record of IP addresses available to the mobile node. At a step D7, the notification module notifies any application program which has subscribed to the notification functions, that the mobile node no longer has use of a particular IP address and provides, if available, another IP address to be used from its internal IP address table.

Various modifications may be made to the example embodiments herein before described without departing from the scope of the present invention. Although embodiments of the present invention have been described with reference to mobile IPv6, it will be appreciated that embodiments of the present invention find application with other internet protocol, including for example IPv4. It will also be appreciated that a communications node utilising the present invention may not include a wireless communications device, but may simply be arranged to change an IP address mid-session. Furthermore the correspondent node may also be mobile.

The invention claimed is:

1. A communications system operable to provide a communications session utilizing an internet protocol, the system comprising:
a mobile node having an application layer program and an operating system executing thereon, the application layer program being operable to provide the communications session with a correspondent node using an internet protocol address information, the operating system being operable to monitor the internet protocol address information, to inform the application layer program of a change of internet protocol address information caused by movement of the mobile node,
wherein the application layer program adapts the communications session in accordance with the change of internet protocol address information.

2. A communications system according to claim 1, wherein the application layer program is operable, in response to the change of internet protocol address information, to communicate a new internet protocol address to a corresponding application layer program operating on the correspondent node.

3. A communications system according to claim 2 wherein the application layer program informs the corresponding application program using a Session Initiation Protocol (SIP) message.

4. A communications system according to claim 2, wherein the application layer program is operable to monitor internet packets from the correspondent node having the new internet protocol address and internet packets from the correspondent node having a currently used internet protocol address, the currently used internet protocol address corresponding to an affiliation of the mobile node with a first network, the new internet protocol address being associated with a second network.

5. A communications system according to claim 3, wherein the application layer program is operable to monitor internet packets from the correspondent node having the new internet protocol address and internet packets from the correspondent node having a currently used internet protocol address, the currently used internet protocol address corresponding to an affiliation of the mobile node with a first network, the new internet protocol address being associated with a second network.

6. A communications system according to claim 1, wherein the operating system comprises an internet protocol stack comprising
an address table for storing internet protocol addresses,
an address adder operable to add an internet protocol address to the address table, and
an address remover operable to remove an internet protocol address from the address table, wherein the change in internet protocol address information is effected by at least one of the addition of an internet protocol address to the address table and the deletion of an internet protocol address from the address table.

7. A communications system according to claim 1, wherein the operating system comprises a notification module operable to inform the application layer program of a change of internet protocol address information from an addition of an internet protocol address or the deletion of an internet protocol address, and an internet protocol stack comprises a notification plug-in operable to monitor the internet protocol stack for the addition or the deletion of internet protocol addresses from the address table, to derive the change of internet protocol address information from the addition or deletion of the internet protocol addresses and to inform the notification module of the change of address information.

8. A communications system according to claim 7, wherein the notification plug-in is responsive to an output of the address adder and the address remover to derive a change of internet protocol address information.

9. A method of providing a communications session using an application layer program operating on a mobile node, the communications session utilizing an internet protocol to communicate with a correspondent node, the method comprising:
providing an operating system for supporting the application layer program,
establishing an interface between the operating system and the application layer program to monitor a change of internet protocol address information caused by movement of the mobile node,
configuring the operating system to inform the application program of the change of internet protocol address information via the interface, and
adapting the communications session in accordance with the change of internet protocol address information.

10. A method according to claim 9, wherein the adapting includes communicating a new internet protocol address information from the application layer program to a corresponding application program operating on the correspondent node.

11. A method according to claim 10, wherein the application layer program informs the corresponding application layer program using a Session Initiation Protocol (SIP) message.

12. A method according to claim 10, further comprising:
monitoring internet protocol packets received from the correspondent node having the new internet protocol address; and
monitoring internet protocol packets received from the correspondent node having a currently used internet protocol address, the currently used internet protocol address corresponding to an affiliation of the mobile node with a first network, the new internet protocol address being associated with a second network.

13. A method according to claim 11, further comprising:
monitoring internet protocol packets received from the correspondent node having the new internet protocol address and
monitoring internet protocol packets received from the correspondent node having a currently used internet protocol address, the currently used internet protocol address corresponding to an affiliation of the mobile node with a first network, the new internet protocol address being associated with a second network.

14. A mobile node operable to communicate via a communications system utilizing an internet protocol, the mobile node being operable to run an application layer program, the mobile node comprising:
an operating system operable to monitor a change of internet protocol address information caused by movement of the mobile node,
to inform the application layer program of the change of internet protocol address information, wherein the application layer program is arranged to adapt the communications session with a correspondent node in accordance with the change of internet protocol address information.

15. A method of conducting a communications session using a mobile node via a communications system utilizing an internet protocol, the communications session being conducted between the mobile node and a correspondent node in accordance with an application layer program of the mobile node, the method comprising:
monitoring a change of internet protocol address information caused by movement of the mobile node;
informing the application layer program of the change of internet protocol address information; and
adapting the communications session via the application program in accordance with the change of internet protocol address information.

16. A method of informing an application layer program running a communications session between a mobile node and a correspondent node from an operating system of the mobile node of a change of internet protocol address information caused by movement of the mobile node, the method comprising:
responding to a change of internet protocol address information of the mobile node to inform the application layer program operating on the mobile node of the change of internet protocol address information; and
adapting the communications session via the application layer program in accordance with the change of internet protocol address information.

17. A method of monitoring a change of internet protocol address information caused by movement of the mobile node; for communication to an application layer program operating on the mobile node, the method comprising:
monitoring an internet protocol stack for an addition or a deletion of internet protocol addresses from an address table,
deriving the change of internet protocol address information from the addition or deletion of internet protocol addresses from the address table, and
informing a notification module of the change of address information for communication to the application layer program to adapt communications between the mobile node and a correspondent node.

18. A computer readable storage medium encoded with computer program instructions which when loaded onto a data processor of a mobile node causes the data processor to perform a method of communicating with a correspondent node via a communications system utilizing an internet protocol in accordance with an application layer program, the method comprising:
monitoring a change of internet protocol address information caused by movement of the mobile node, and
informing the application layer program of the change of internet protocol address information
adapting the communications session via the application layer program in accordance with the change of internet protocol address information.

* * * * *